Patented Aug. 30, 1927.

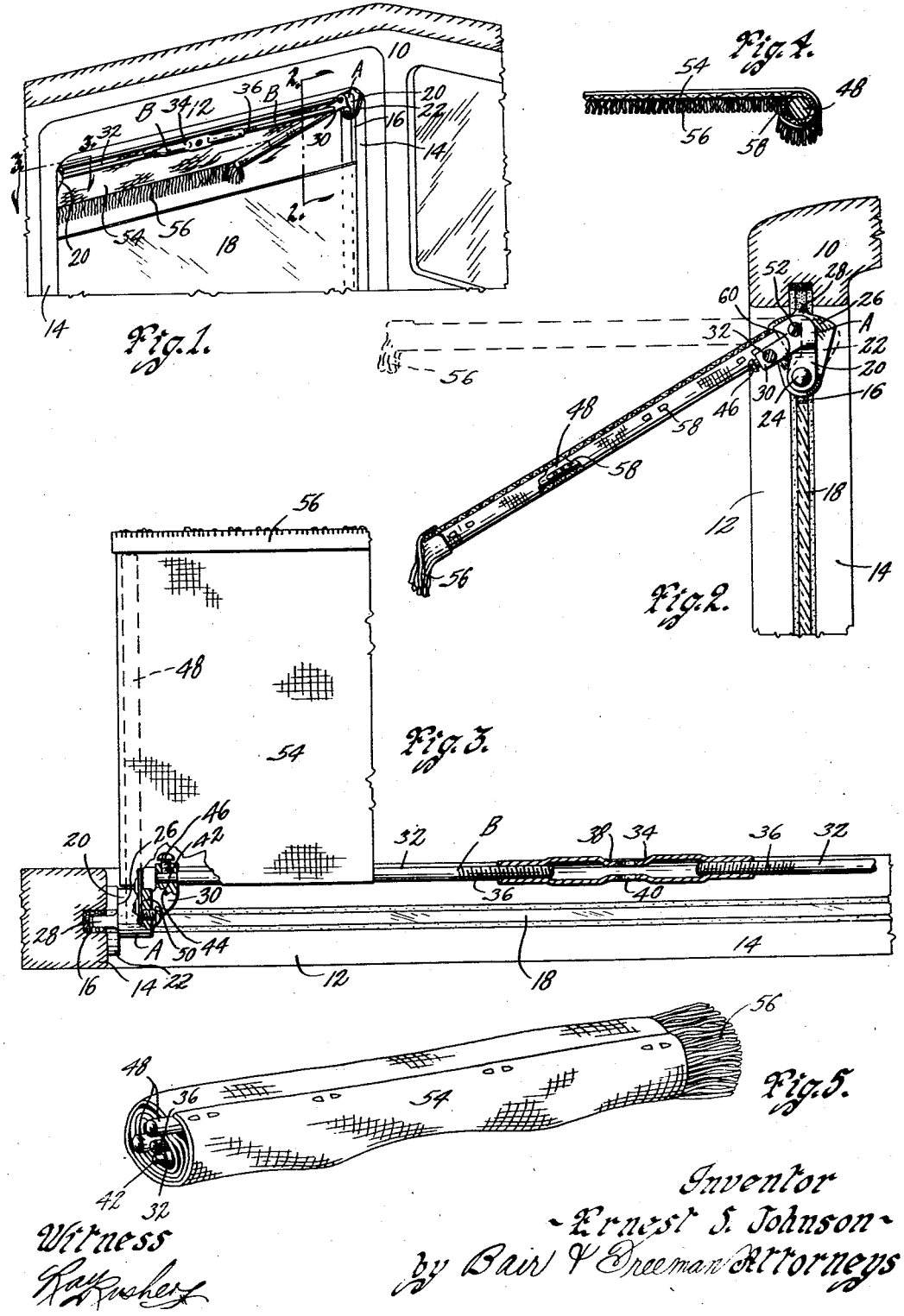

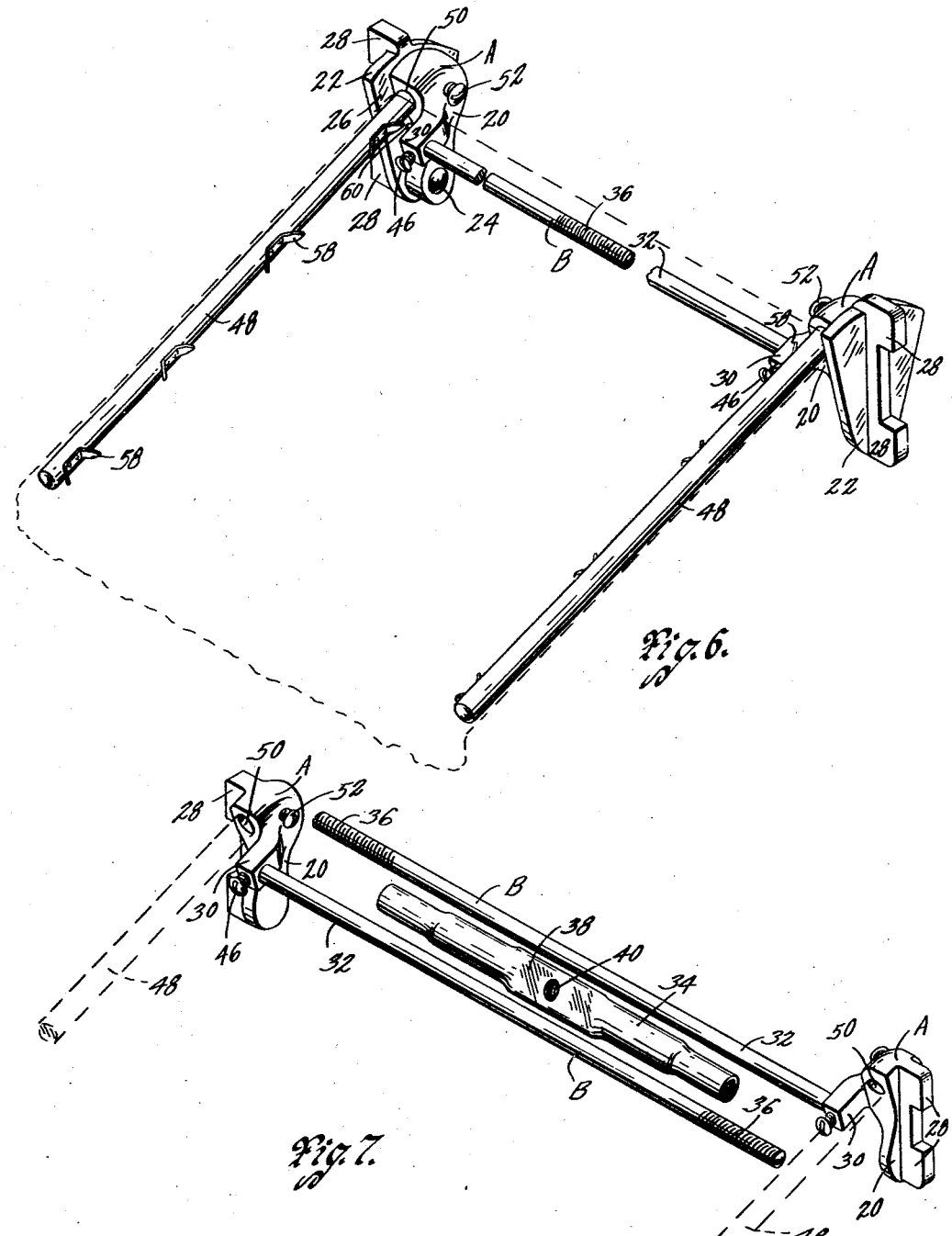

1,640,660

UNITED STATES PATENT OFFICE.

ERNEST S. JOHNSON, OF WEBSTER CITY, IOWA.

AWNING STRUCTURE.

Application filed October 4, 1926. Serial No. 139,301.

The object of my invention is to provide an awning structure especially adapted for use upon automobile windows, the parts of the device being simple, durable and comparatively inexpensive.

More particularly it is my object to provide an awning structure having an extensible frame adapted to frictionally engage the sides of the window casing and to have mounted thereon an awning capable of being adjusted so that the awning may be extended when the frame is extended.

Still a further object is to provide an awning structure wherein the awning proper or canvas may be varied in width so that the awning itself may be of substantially the same width as the window opening to which the awning is applicable.

Still a further object is to provide a mounting for an awning adapted to be frictionally held in position upon a window casing and one wherein the awning is capable of being extended or contracted for substantially spanning the distance between the two sides of the window casing.

Still a further object is to provide a pair of spaced fittings adapted to fit against the casing of a window and an adjustable tie rod connection between the fittings whereby the fittings may be spaced various distances apart and may be brought into frictional engagement with the sides of the window casing and to provide supporting arms for a flexible element or canvas so arranged as to permit the canvas to be extended or contracted for corresponding to any adjustment that may be made in the distance between the fittings.

Still a further object is to provide an awning support for automobile windows wherein the automobile window may be brought to almost closed position without interfering with the awning and at the same time to provide such a mounting as will permit the awning to be moved from an inclined position to a substantially horizontal position.

Still a further object is to provide an awning structure capable of being quickly dismantled and adapted when not in use to form a package of comparatively small size wherein the device may be packed, stored or shipped.

Still a further object is to provide a frame having a pair of rotatably mounted awning supporting arms thereon adapted to have an awning carried thereby for spanning the distances therebetween, the frame being extensible and functioning to exert an outward tension on the free ends of said arms for holding the awning taut.

Still a further object is to provide an awning adapted for use in combination with an automobile window or the like wherein the awning or canvas itself may be adjusted to the substantial width of the window openings and when so adjusted may be placed in position where the awning will be frictionally supported upon the window casing and by placing the awning support under tension necessary to secure the frictional engagement thereof there will at the same time be exerted a tension upon the awning carrying arms sufficient to hold the awning taut.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of one corner of an automobile of the sedan type looking from the inside, with my improved awning structure mounted thereon.

Figure 2 is a sectional view taken on line 2—2 of Figure 1, the dotted lines illustrating the awning when in horizontal position.

Figure 3 is a sectional view taken on line 3—3 of Figure 1, parts being broken away and shown in section to better illustrate the construction.

Figure 4 is a detail view taken on line 4—4 of Figure 1.

Figure 5 is a perspective view of the awning structure in collapsed and rolled up position for storing and shipping.

Figure 6 is a perspective view of the awning frame and

Figure 7 is a similar view of a slightly modified form of fitting, the parts being in disassembled position.

In the accompanying drawings I have used the reference numeral 10 to indicate generally an automobile body of the sedan type. The body 10 includes a window casing 12 which may form a part of the door of the automobile.

The window casing 12 includes a pair of vertical side members 14 which are provided with window receiving grooves 16. A window 18 is slidably mounted within the window grooves 16. The parts just described are of the ordinary construction.

My improved awning structure includes a pair of spaced fittings A. The fittings A are of two parts 20 and 22 pivotally connected together at their lower ends by pivot bolts or the like 24.

The part 22 of each fitting A is formed with a flat surface 26 against which one surface of the part 20 rests. The parts 20 and 22 may be said to frictionally engage each other. The part 22 is formed with an outwardly directed lug or flange 28 adapted to fit into the window groove 16 in the side frames 14.

The part 22 is of sufficient width to extend over the window groove 16 and rest against the side members 14. The lugs 28 retain the parts 22 in proper position. The parts 20 are each formed with an outwardly and downwardly projecting portion 30.

The projecting portions 30 are connected together by a tie rod connection B. The tie rod connection B includes a pair of rods 32 having their inner ends screw threaded for receiving an elongated turnbuckle element 34.

The turnbuckle element 34 is interiorly screw threaded for coacting with the screw threaded ends 36 of the rods 32. The turnbuckle element 34 is formed with flat sides 38 wherein it may be engaged for imparting the necessary rotation thereto for drawing the rods 32 toward each other or forcing them apart.

The flat portion 38 of the turnbuckle element 34 is formed with an opening 40 for receiving any kind of a tool desired for securing proper leverage for rotating the turnbuckle 34.

The outer ends of the rods 32 are each formed with a contracted portion 42 adapted to extend into openings 44 formed in the projections 30. Set screws 46 are employed in the projections 30 for engaging the contracted portions 42 of the rods 32 for holding the parts together.

From the construction of the parts just described it will be noted that the pair of spaced fittings A are connected together through the medium of the tie rod connection B.

The distances between the two fittings A may be varied by the turnbuckle element 34. When the turnbuckle element 34 is rotated so as to impart an outward movement of the fittings A, then such movement will cause the part 22 of each of the fittings A to frictionally engage the sides 14 of the casing 12.

This movement will also cause the part 20 of each of the fittings A to frictionally engage the part 22 and thus prevent free pivotal movement of the part 20 relative to the part 22 of each of the fittings.

It will be noted that the projections 30 extend outwardly and downwardly from the vertical axis of the lugs 28 so that as a matter of fact, there is a tendency for the projections 30 to twist relative to the lugs 28.

The purpose of mounting the projections 30 in the manner just described will hereinafter be more fully set forth.

Rotatably mounted in each of the parts 20 of the fittings A is an awning supporting arm 48. The arms 48 are rods having one end projected into sockets or openings 50 formed in the parts 20.

In order to hold the rods or arms 48 against rotation and within the openings 50, I provide set screws 52. When the set screws 52 are loose then it is possible to rotate the rods 48 or remove them entirely from the fittings.

It will be noted that the rods 48 extend outwardly and downwardly from the fittings A so as to form a support which will give to the awning the proper angle desired for an awning structure.

Carried by the spaced arms 48 is the flexible element or canvas 54. The canvas 54 is formed with a fringe 56 along its bottom edge. The two side edges of the canvas 54 are connected to the arm 48 in any suitable manner.

In the drawings I have illustrated clips or prongs 58 which are designed to project through the canvas 54 and thereafter by bending the prongs against the arms 48, the canvas will be retained upon the arms 48.

The canvas 54 is designed to be wrapped or wound upon the arms 48. After the canvas has been wound upon the arms 48 and the set screws 52 locked, then the canvas will remain taut between the two spaced arms and will of course, span the distances therebetween.

The operation of the turnbuckle 34 after the canvas has been positioned upon the arms 48 will cause the outer or lower ends of the arms 48 to be under an outward tension due to the arrangement of the projections 30.

The outer tension upon the arms 48 will always insure the awning 54 remaining taut, a feature which is very desirable.

It will be noted that the awning supporting arms 48 and the parts 20 may be swung together upon the pivot bolts 24 thus allowing the awning to move from an inclined position as shown in solid lines in Figure 2 to the position shown in dotted lines in said figure.

In order to limit the amount of downward movement of the arms 48 I provide stop pins 60 upon the parts 22 of the fittings A which are engaged by the parts 20. The stop pin 60 is clearly illustrated in Figure 2 of the drawings.

It will be noted that the awning or canvas is entirely carried by the two spaced arms 48 and that the window 18 may be raised to almost closed position except for the slight space occupied by the fittings A. The awning inclines a sufficient distance so as to insure against any rain driving in through the opening left by the window 18 on account of the fitting A.

It thus follows that my awning structure may be left upon the frame or casing without the necessity of removing it in case of rain because the window may be almost closed. The awning structure may be moved if desired for evening driving to the position shown in dotted lines in Figure 2, that is, a substantially horizontal position and thus secure proper ventilation.

The tie rod connection B when extended causes the entire awning frame to be retained upon the window casing without additional fastening devices on account of its frictional engagement therewith. In order to extend the awning frame, that is, have the two fittings A a greater distance apart, all that is necessary is to extend the tie rod connection B. The fittings A may therefore, be brought into engagement with the sides of window casings different distances apart.

In order to have the awning or canvas 54 substantially the same width as the window opening, all that is necessary is to release the set screws 52 and unroll the canvas 54 from the arms 48.

The tie rod connection B and fittings A can then be adjusted for the particular width of window opening that it is desired to have the awning upon.

The arms 48 having the canvas thereon are then inserted in the opening 50 and the set screws 52 are locked. The entire awning assembly is then in operative position. Further extension of the tie rod connection B will cause the fittings A to frictionally engage the sides of the window casing and at the same time take up any slack that there may be in the canvas 54 so that it will be taut.

It may be said that the tie rod connection B serves several functions. First, it enables the fittings A to be adjusted towards or from each other; second, after the fittings are adjusted it then provides means for applying tension upon the fittings for holding them against the side members of the window casing; third, it applies tension to the parts 20, thus causing frictional engagement between the parts 22 and the parts 20 for preventing free pivotal movement upon the pivot bolts 24; and fourth, it tends to force the two projections 30 outwardly or away from each other and due to their position which is offset relative to the lugs 24, it tends to exert an outward movement upon the arms 48 insuring the canvas that is mounted thereon to be taut.

In Figure 7 of the drawings I have shown the fittings A formed of a single piece of material and when in this form there is not provided any pivotal movement of the awning member.

The position of the awning is always inclined. The connection between the fittings A in Figure 7 is exactly the same as in Figure 6 and the awning supporting arms 48 are likewise the same.

The structure of Figure 6 enables pivotal movement of the awning member from the position shown in solid lines in Figure 2, to the position shown in dotted lines in the same figure.

While in Figure 7 the fittings A tend to hold the awning in the position shown in solid lines in Figure 2. The fittings A may be removed from the ends of the rods 32 by loosening the set screws 46 and when so doing the fittings together with the rods 48, may be rolled up in the canvas 54.

The rods 32 and the turnbuckle element 34 may be enclosed with the canvas 54 so that the entire awning structure when disassembled will occupy a package of minimum size. The rods 32 are comparatively short and the turnbuckle element 34 is comparatively long thus providing three pieces which form the tie rod connection B of substantially equal length.

The advantage of my structure resides in the fact that I have the awning or canvas extensible so that when the frame is extended, the awning or canvas may be likewise extended so that the completed awning structure will at all times be the same width as the distances between the side members of the casing upon which the awning structure is mounted.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An awning structure comprising a pair of fittings adapted to fit against the casing of a window, side arms carried by said fittings, a tie rod connection between said fittings, means for adjusting the tie rod connection for spacing said fittings and arms different distances apart and placing the fittings under pressure for frictionally engaging the window casing, a flexible element carried by said arms and spanning the distance therebetween, said adjusting means functioning to exert an outward pressure on said arms for holding the element taut.

2. An awning structure comprising a pair of fittings adapted to fit against the casing of a window, side arms carried by said fittings, an adjustable connection between said fittings, for spacing them and the arms different distances apart and placing the fittings under pressure for frictionally engaging the window casing, a flexible element carried by said arms and spanning the distance therebetween, said adjustable connection functioning to exert an outward pressure on said arms for holding the element taut, said element being adjustable on said arms for spanning different distances which said arms may assume.

3. In combination with a window casing having window grooves in its sides, of an awning structure comprising a pair of two part pivotally connected together fittings adapted to fit against the sides of the window casing, lugs on one part of said fittings projecting into the window grooves, means for placing said fittings under pressure for holding them in position, said means also preventing pivotal movement of said parts relative to each other, a pair of spaced arms carried by the one part of each of said fittings, a flexible element carried by said arms and adapted to span different distances between said arms.

4. In combination with a window casing having window grooves in its sides, an awning structure comprising a pair of two part pivotally connected together fittings adapted to fit against the sides of the window casing, lugs on one part of said fittings projecting into the window grooves, means for placing said fittings under pressure for holding them in position relative to the window casing, a pair of spaced arms carried by the other part of said fittings, said last parts and arms being capable of pivotal movement, relative to the other parts, said tensioning means also serving to cause frictional contact between the parts of the fittings for maintaining the arms in any of their adjusted positions, a flexible element carried by said arms and adapted to have one of its ends wound or unwound on one of said arms whereby the flexible element may be made to span different distances between said arms.

5. A structure of the class described, comprising a pair of frame engaging members, fittings pivoted to the respective members in frictional engagement therewith, awning supporting arms mounted in the fittings for rotatable adjustment, an awning having its ends secured to the arms and longitudinal extensible means connecting the fittings and means for engaging the rods to prevent their further rotation after they have been adjusted.

6. An awning structure comprising a pair of fittings adapted to fit against the frame of a window, a pair of arms extending from said pair of fittings, a flexible element mounted upon said arms and means for placing said fittings under tension whereby the fittings frictionally engage the window frame and exert a spreading movement to said arms for maintaining the flexible element taut.

7. An awning structure comprising a pair of fittings adapted to fit against the frame of a window, a pair of arms rotatably mounted and extending from said pair of fittings, a flexible element adapted to be wound upon or unwound from said arms and means for placing said fittings under pressure whereby the fittings frictionally engage the window frame and exert a spreading movement to said arms for maintaining the flexible element taut.

8. An awning structure comprising a pair of fittings adapted to fit against the frame of a window, an awning support pivoted thereto, a flexible awning carried by said support, said support including extensible means for causing parts of the support to frictionally engage the fittings to prevent pivotal movement of the awning support relative to the fittings and to also cause frictional engagement between said fittings and the window frame.

9. An awning structure comprising a pair of fittings adapted to fit against the frame of a window, a pair of awning support members pivoted thereto, arms extending from said members, a flexible awning supported on said arms and extensible means connecting said members together for causing them to frictionally engage the fittings to prevent pivotal movement of the support relative to the fittings, to exert a spreading movement to the outer end of said arms for maintaining the awning taut and to cause frictional engagement between said fittings and the window frame.

10. A device of the class described comprising a pair of fittings for engaging the frame of a window, a pair of arms rotatably mounted in said pair of fittings, means for locking the arms against rotation, a flexible element spanning the distance between said arms and adapted to be rolled on the arms, a two part tie rod connecting said fittings, a threaded tube for coacting with and extensibly connecting the parts of said tie rod together, the connection of the tie rod to the fittings being at a point between the window frame engaging surface of the fittings and the outer ends of the arms whereby an extensible movement imparted to the parts of said tie rod will cause frictional engagement between the fittings and the window frame and a pivotal movement to the fittings for spreading the arms.

11. An awning structure comprising a pair of fittings adapted to engage the casing of a window, an outwardly extending arm secured to each of said fittings, an awning supported on said arms, a projection on each fitting extending outwardly and an extensible connection between said projections for spreading the arms.

12. An awning structure comprising a pair of fittings adapted to engage the casing of a window having a window groove therein, lugs on said fittings for positioning them relative to said groove, an outwardly extending arm secured to each of said fittings, an awning supported on said arms, a projection on each fitting extending outwardly and an extensible connection between said projections whereby pressure may be placed on said projections for causing the fittings to engage the window casing and for imparting a pivotal movement to the fittings for spreading the arms.

13. An awning structure comprising a pair of fittings adapted to engage the casing of a window, a pair of awning supporting members secured to said fittings for pivotal movement relative to the window casing, a pair of arms extending outwardly from said members, a canvas connecting the arms, a projection on each member also extending outwardly and means coacting with said projections for spreading them to cause frictional engagement of the members with the fittings to prevent pivotal movement of the members, to cause frictional engagement of the fittings with the window casing and to spread the arms for tightening the canvas.

14. An awning structure comprising an extensible awning frame, a pair of fittings for engaging the casing of a window, said frame being pivoted to said fittings whereby an extensible movement imparted to the awning frame will cause the fittings to engage the window frame and will also cause the frame to frictionally engage the fittings and an extensible awning on said frame capable of being adjusted corresponding to the extension or contraction of the awning frame.

15. An awning structure comprising a pair of fittings for engaging the opposite sides of a window casing, an awning supporting member including a rod pivoted to each fitting, an awning supported on the rods and extensible means interposed between the awning supporting members whereby extension of said means causes the rods to be spread for maintaining the awning taut and causes each awning supporting member to frictionally engage its corresponding fitting.

16. An awning structure comprising a pair of fittings for engaging the opposite sides of a window casing, an awning supporting member including a rod pivoted to each fitting, an awning supported on the rods and extensible means interposed between the awning supporting member and engaging them at a point between the pivot point of each member to its corresponding fitting and the outer ends of the rod whereby extension of said means causes the rods to be spread for maintaining the awning taut, causes each awning supporting member to frictionally engage its corresponding fitting and the fittings to engage the window casing.

Des Moines, Iowa, September 29, 1926.

ERNEST S. JOHNSON.